(No Model.)

W. J. SMITH.
CASTER.

No. 488,954. Patented Dec. 27, 1892.

Witnesses:
Inventor:
Wm. John Smith

UNITED STATES PATENT OFFICE.

WILLIAM JOHN SMITH, OF BOSTON, MASSACHUSETTS, ASSIGNOR TO CHARLES S. LARRABEE, TRUSTEE, OF SAME PLACE.

CASTER.

SPECIFICATION forming part of Letters Patent No. 488,954, dated December 27, 1892.

Application filed January 25, 1892. Serial No. 419,117. (No model.)

*To all whom it may concern:*

Be it known that I, WILLIAM JOHN SMITH, of Boston, in the county of Suffolk and State of Massachusetts, have invented a new and useful Caster, of which the following is a specification, reference being had to the accompanying drawings, in which—

Figure 1:
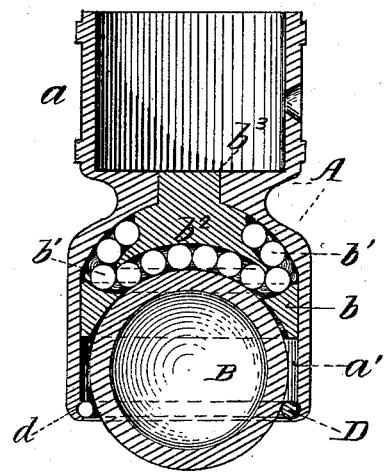
Figure 3:
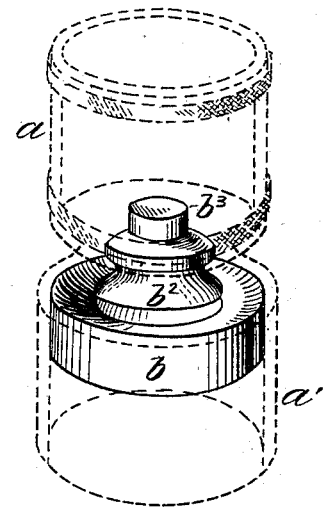
Figure 2:
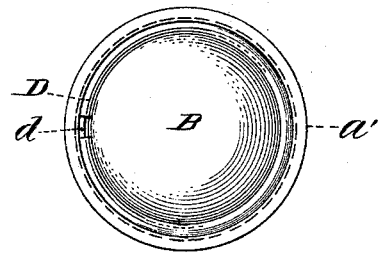

Figure 1 is a central lengthwise section, with the main ball in elevation. Fig. 2 a bottom plan; Fig. 3 a perspective view of parts for holding and guiding the anti-friction balls, with the case indicated by dotted lines.

My invention relates to that class of casters in which a ball projects from a case secured to a leg of the furniture; and turns upon a suitable bearing in that case, and a second feature of my invention relates to the bearing for that ball. Both features are fully described below, and stated in the claims.

The drawings show a caster embodying both features of my invention; A being the case, formed at $a$ for attachment to the article, and at $a'$ in the form of a cylinder open at the bottom to receive the ball B, which is placed in it and comes to any suitable bearing in the interior of the case A with a portion of the ball B projecting, as shown. The ball B is held in place by the ring D, which after the ball B is put in place is snapped into a recess $d$ about the mouth of case A. This makes a complete ball-caster which, while closely resembling known ball casters, is yet new in that the ball is held in place by a circular spring D, snapped into a groove $d$ in the lower part $a'$ of case $a$. Heretofore such balls have been held in place in various ways; for example by a shell applied to the case after the ball was inserted; and also, (see English Patent No. 15,838 of 1887, Figs. 1 and 3) by a peculiar ring of metal, which entered a groove in the lower part of the case and was then expanded by altering the shape of the ring, which alteration of shape slightly increased the outer diameter of the ring. This I disclaim; for practically the variation in diameter to be obtained in this way is slight, and after this ring has been once inserted it cannot be removed and again inserted; while with the circular spring D, the variation of diameter is ample and this spring can readily be taken out and replaced at pleasure,—a matter of much practical importance with ball casters. The ball bearing shown is also not new in principle; and one form of it is shown in English Patent No. 2,508 of 1858; but my construction is wholly new, consisting of the case A, into which the inverted cup $b^2$ may be dropped and held in place by its shank $b^3$; then the small balls are poured in, and after that the ring $b$ is placed over the small balls and the ball B over the ring $b$. This ring $b$, loose in case A, allows the small balls to take their places, and does away with all that nicety of construction which is essential when the ring $b$ is not used, but the interior of the case is formed with a spherical recess for the main ball and a chamber above that recess for the small balls, as in English Patent No. 2,508 of 1858. In my caster the ring $b$ acts, when in use, on ball B, and thereby more perfectly performs its function, which is to form with that part of ball B projecting through it one wall of a chamber for the anti-friction balls $b'$, the other walls of this chamber being formed by the inner walls of case A, and the inverted cup $b^2$ and its shank $b^3$. This chamber thus formed is filled with anti-friction balls $b'$, some of which always fill the space between that part of main ball B which projects through ring $b$, and the concave part of cup $b^2$; so that when the ball revolves these anti-friction balls travel freely about, passing over the concave surface of ring $b$ around shank $b^3$ over cup $b^2$, and between cup $b^2$ and ball B, as required to allow free motion of ball B on any axis; or what is the same thing the free rolling of ball B in all directions no matter how quickly or widely changed.

The operation will be clear without further description.

What I claim as my invention is:

1. In combination, case A; ball B; a bearing in case A for ball B; circular spring D; and a groove $d$ in case A in which spring D is inserted by bringing its ends together and allowing it to expand; all substantially as described.

2. In combination cylindrical case A; detachable ring $b$ concave on its upper and lower surfaces; cup $b^2$; its shank $b^3$; ball B; and anti-friction balls, confined in case A by ring $b$, cup $b^2$, and ball B, substantially as set forth.

WILLIAM JOHN SMITH.

Witnesses:
J. E. MAYNADIER,
JOHN R. SNOW.